US012559588B2

(12) United States Patent
Liao et al.

(10) Patent No.: US 12,559,588 B2
(45) Date of Patent: Feb. 24, 2026

(54) POLYMER AND MANUFACTURING METHOD THEREOF

(71) Applicant: NAN YA PLASTICS CORPORATION, Taipei (TW)

(72) Inventors: Te-Chao Liao, Taipei (TW); Jung-Jen Chuang, Taipei (TW); Tzu-Huan Wong, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 561 days.

(21) Appl. No.: 18/086,656

(22) Filed: Dec. 22, 2022

(65) Prior Publication Data

US 2024/0166802 A1 May 23, 2024

(30) Foreign Application Priority Data

Oct. 27, 2022 (TW) ................................. 111140861

(51) Int. Cl.
*C08G 63/183* (2006.01)
*C08G 63/20* (2006.01)
*C08G 63/78* (2006.01)

(52) U.S. Cl.
CPC ................................. *C08G 63/183* (2013.01)

(58) Field of Classification Search
None
See application file for complete search history.

(56) References Cited

U.S. PATENT DOCUMENTS

2019/0153152 A1 5/2019 Beckham et al.

FOREIGN PATENT DOCUMENTS

| | | | | | |
|---|---|---|---|---|---|
| CN | 102336896 | | | 2/2012 | |
| CN | 102336896 | A | * | 2/2012 | |
| CN | 107936235 | A | * | 4/2018 | ............ C08G 63/20 |
| CN | 112521588 | | | 3/2021 | |
| CN | 113354799 | | | 9/2021 | |
| CN | 113354799 | A | * | 9/2021 | ............ C08G 63/87 |
| JP | 2018145221 | | | 9/2018 | |
| JP | 2022105312 | | | 7/2022 | |
| JP | 2022157070 | | | 10/2022 | |
| TW | 201712051 | | | 4/2017 | |
| WO | 2009087910 | | | 7/2009 | |

OTHER PUBLICATIONS

"Office Action of Taiwan Counterpart Application", issued on May 3, 2023, p. 1-p. 4.
"Office Action of Japan Counterpart Application", issued on Jul. 17, 2024, p. 1-p. 5.

* cited by examiner

*Primary Examiner* — Ha S Nguyen
(74) *Attorney, Agent, or Firm* — JCIPRNET

(57) ABSTRACT

A manufacturing method of a polymer includes the following steps. Terephthalic acid, butanediol, adipic acid, and carboxybenzene are used as raw materials to perform an esterification reaction to obtain a reactant. A catalyst is added to the reactant, and a polymerization reaction is performed.

2 Claims, 2 Drawing Sheets

POLYMER AND MANUFACTURING METHOD THEREOF

CROSS-REFERENCE TO RELATED APPLICATION

This application claims the priority benefit of Taiwanese application no. 111140861, filed on Oct. 27, 2022. The entirety of the above-mentioned patent application is hereby incorporated by reference herein and made a part of this specification.

BACKGROUND

Technical Field

The disclosure relates to the technical field of a polymer and a manufacturing method thereof, and particularly, to a biodegradable polymer and a manufacturing method thereof.

Description of Related Art

Polybutylene Adipate Terephthalate (PBAT) is a copolymer of terephthalic acid, butanediol and adipic acid, and has high ductility, high elongation at break, high impact resistance and other advantages. Due to the biodegradable property, PBAT is used to replace traditional plastic materials such as polyethylene terephthalate (PET). However, due to the low tensile strength and tensile modulus, PBAT is difficult to apply to products that require rigidity.

SUMMARY

The disclosure provides a polymer and a manufacturing method thereof, and the polymer has biodegradable characteristics and can improve the problem of low rigidity of polybutylene adipate terephthalate.

At least one embodiment of the present disclosure provides a polymer having the following structural formula (1):

structural formula (1)

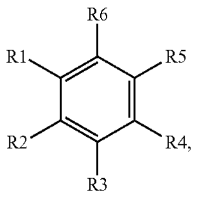

wherein R1 to R6 in the structural formula (1) are each independently selected from the group consisting of the following: hydrogen, C1 to C8 straight-chain alkyl group, C1 to C8 branched-chain alkyl group, C1 to C8 cycloalkyl group, C1 to C8 alkenyl group, C1 to C8 alkynyl group and a group represented by structural formula (2), and wherein at least three of R1 to R6 each are groups represented by structural formula (2):

structural formula (2)

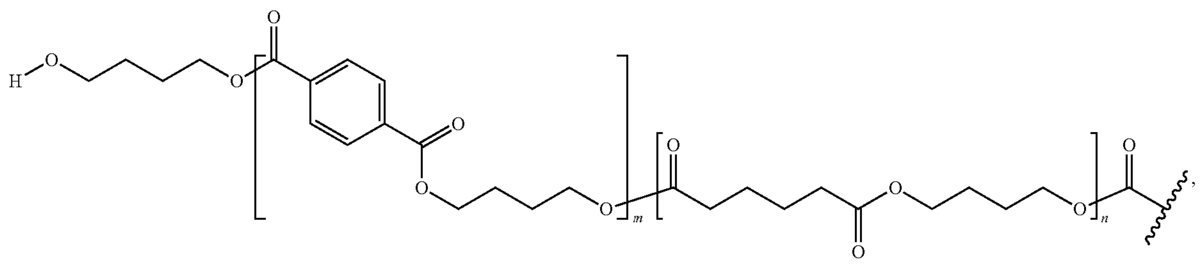

wherein m in the structural formula (2) is 1 to 250, and n is 1 to 250.

In some embodiments, three of R1 to R6 each are groups represented by structural formula (2), and the other three of R1 to R6 are each independently selected from the group consisting of: hydrogen, C1 to C8 straight-chain alkyl group, C1 to C8 branched-chain alkyl group, C1 to C8 cycloalkyl group, C1 to C8 alkenyl group, C1 to C8 alkynyl group.

In some embodiments, four of R1 to R6 each are groups represented by structural formula (2), and the other two of R1 to R6 are each independently selected from the group consisting of: hydrogen, C1 to C8 straight-chain alkyl group, C1 to C8 branched-chain alkyl group, C1 to C8 cycloalkyl group, C1 to C8 alkenyl group, C1 to C8 alkynyl group.

In some embodiments, five of R1 to R6 each are groups represented by structural formula (2), and the another one of R1 to R6 is independently selected from the group consisting of: hydrogen, C1 to C8 straight-chain alkyl group, C1 to C8 branched-chain alkyl group, C1 to C8 cycloalkyl group, C1 to C8 alkenyl group, C1 to C8 alkynyl group.

In some embodiments, R1 to R6 are all groups represented by structural formula (2).

At least one embodiment of the present disclosure provides a method for manufacturing a polymer, including the following steps. The esterification reaction is carried out with terephthalic acid, butanediol, adipic acid and carboxybenzene as raw materials to obtain a reactant. A catalyst is added to the reactant, and the polymerization reaction is performed.

In some embodiments, the polymer manufactured by the method for manufacturing the polymer has the structural formula (1), wherein R1 to R6 in the structural formula (1) are each independently selected from the group consisting of the following: hydrogen, C1 to C8 straight-chain alkyl group, C1 to C8 branched-chain alkyl group, C1 to C8 cycloalkyl group, C1 to C8 alkenyl group, C1 to C8 alkynyl group and the group represented by structural formula (2).

In some embodiments, the esterification reaction using terephthalic acid, butanediol, adipic acid and carboxybenzene as raw materials includes the following steps. Terephthalic acid, butanediol, and adipic acid are mixed, and a first esterification reaction is performed at a first reaction temperature to obtain a first esterification reaction product. The first esterification reaction product is mixed with carboxybenzene, and a second esterification reaction is performed at a second reaction temperature to obtain a second esterification reaction product, wherein the second esterification reaction product is the reactant, and the second reaction temperature is higher than or equal to the first reaction temperature.

In some embodiments, carboxybenzene includes at least one of tricarboxybenzene, tetracarboxybenzene, pentacarboxybenzene, and hexacarboxybenzene.

In some embodiments, based on the total added amount of terephthalic acid, adipic acid and carboxybenzene added, the added amount of carboxybenzene is 0.1 mol % to 15 mol %.

Based on the above, the degree of cross-linking of the polymer can be increased by adding carboxybenzene, so as to increase the rigidity of the polymer.

DESCRIPTION OF THE EMBODIMENTS

A polymer provided by the disclosure has the following structural formula (1):

structural formula (1)

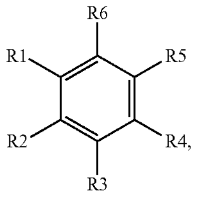

wherein R1 to R6 in the structural formula (1) are each independently selected from the group consisting of the following: hydrogen, C1 to C8 straight-chain alkyl group, C1 to C8 branched-chain alkyl group, C1 to C8 cycloalkyl group, C1 to C8 alkenyl group, C1 to C8 alkynyl group and a group represented by structural formula (2), and wherein at least three of R1 to R6 each are groups represented by structural formula (2):

structural formula (2)

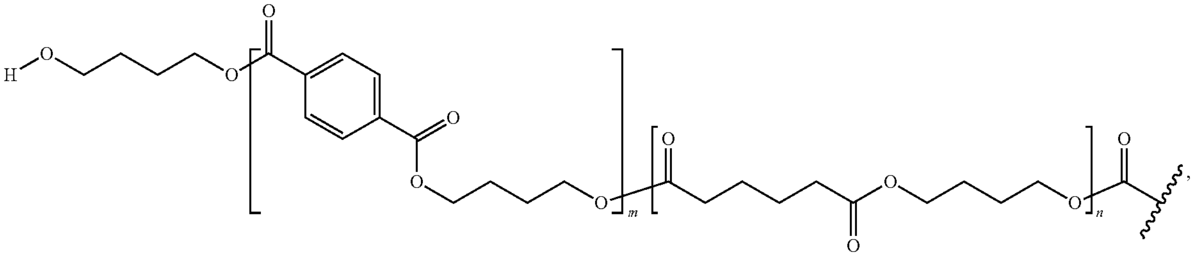

wherein m in the structural formula (2) is 1 to 250, and n is 1 to 250. In some embodiments, m and n are both preferably 50-150. If only one of R1 to R6 is represented by the structural formula (2), the strength of the polymer will decrease. If only two of R1 to R6 are represented by the structural formula (2), the group of the structural formula (2) does not have sufficient influence on the strength of the polymer.

In some embodiments, three of R1 to R6 each are groups represented by structural formula (2), and the other three of R1 to R6 are each independently selected from the group consisting of: hydrogen, C1 to C8 straight-chain alkyl group, C1 to C8 branched-chain alkyl group, C1 to C8 cycloalkyl group, C1 to C8 alkenyl group, C1 to C8 alkynyl group.

In some embodiments, four of R1 to R6 each are groups represented by structural formula (2), and the other two of R1 to R6 are each independently selected from the group consisting of: hydrogen, C1 to C8 straight-chain alkyl group, C1 to C8 branched-chain alkyl group, C1 to C8 cycloalkyl group, C1 to C8 alkenyl group, C1 to C8 alkynyl group.

In some embodiments, five of R1 to R6 each are groups represented by structural formula (2), and the another one of R1 to R6 is selected from the group consisting of: hydrogen, C1 to C8 straight-chain alkyl group, C1 to C8 branched-chain alkyl group, C1 to C8 cycloalkyl group, C1 to C8 alkenyl group, C1 to C8 alkynyl group.

In some embodiments, R1 to R6 are all groups represented by structural formula (2).

Figure 1:
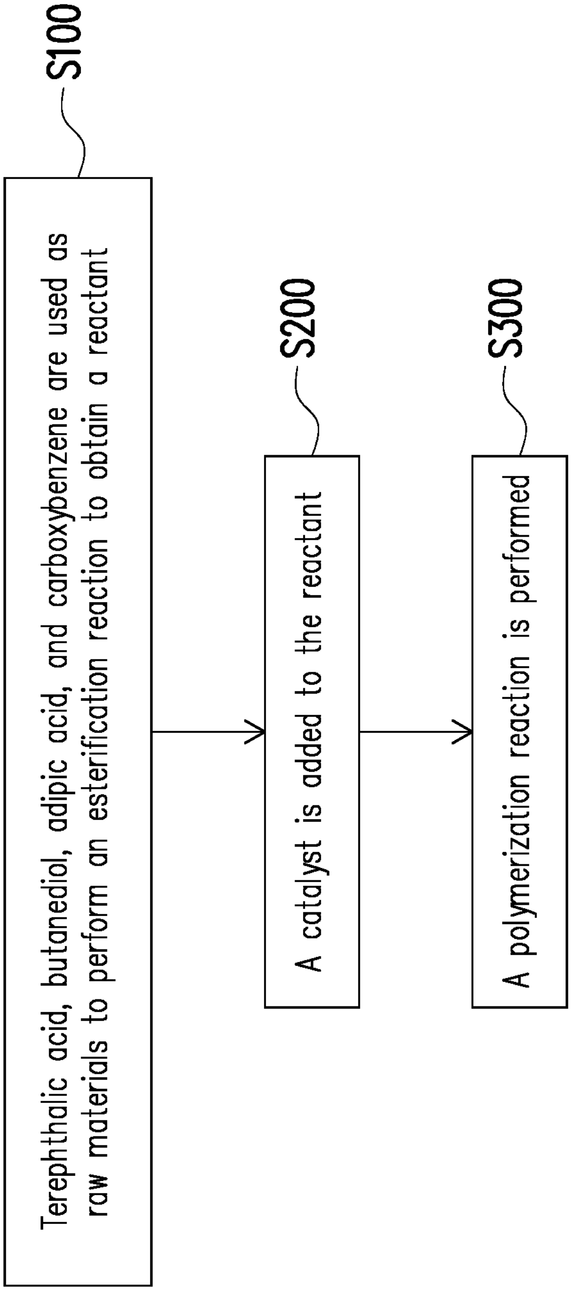
FIG. 1 is a flow chart of a method of manufacturing a polymer according to some embodiments of the present disclosure.

FIG. 1 is a flow chart of a method of manufacturing a polymer according to some embodiments of the present disclosure. Please refer to FIG. 1, firstly, in step S100, terephthalic acid, butanediol, adipic acid and carboxybenzene are used as raw materials for an esterification reaction to obtain a reactant. In some embodiments, carboxybenzene includes at least one of tricarboxybenzene, tetracarboxybenzene, pentacarboxybenzene, and hexacarboxybenzene.

In some embodiments, butanediol may be 1,3-butanediol, 1,4-butanediol, or a combination thereof.

In some embodiments, tricarboxybenzene is, for example, 1,3,5-benzenetricarboxylic acid having structural formula (3), 1,2,4-benzenetricarboxylic acid (Trimellitic acid) having structural formula (4), or 1,2,3-benzenetricarboxylic acid having structural formula (5). In structural formula (3) to structural formula (5), each R is independently selected from the group consisting of the following: hydrogen, C1 to C8 straight-chain alkyl group, C1 to C8 branched-chain alkyl group, C1 to C8 cycloalkyl group, C1 to C8 alkenyl group, C1 to C8 alkynyl group.

Structure formula (3)

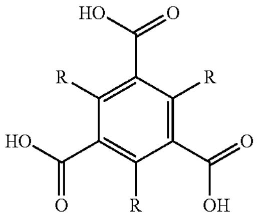

Structure formula (4)

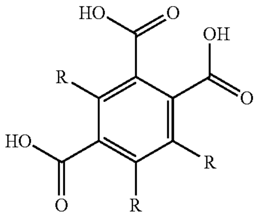

Structure formula (5)

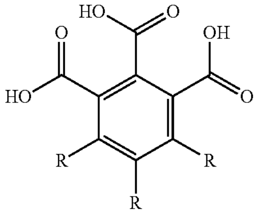

In some embodiments, tetracarboxybenzene is, for example, 1,2,3,5-benzenetetracarboxylic acid having structural formula (6), 1,2,4,5-benzenetetracarboxylic acid (Pyromellitic acid) having structural formula (7), or 1,2,3,4-benzenetetracarboxylic acid having structural formula (8). In structural formula (6) to structural formula (8), each R is independently selected from the group consisting of the following: hydrogen, C1 to C8 straight-chain alkyl group, C1 to C8 branched-chain alkyl group, C1 to C8 cycloalkyl group, C1 to C8 alkenyl group, C1 to C8 alkynyl group.

Structure formula (6)

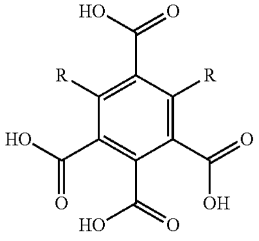

Structure formula (7)

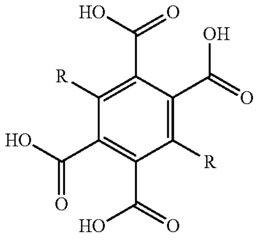

-continued

Structure formula (8)

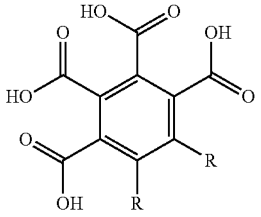

In some embodiments, pentacarboxybenzene is, for example, benzenepentacarboxylic acid having structural formula (9). In the structural formula (9), R is selected from the group consisting of the following: hydrogen, C1 to C8 straight-chain alkyl group, C1 to C8 branched-chain alkyl group, C1 to C8 cycloalkyl group, C1 to C8 alkenyl group, C1 to C8 alkynyl group.

Structural formula (9)

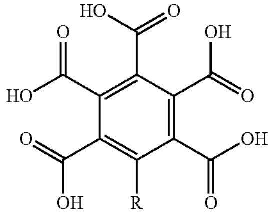

In some embodiments, hexacarboxybenzene is, for example, mellitic acid having structural formula (10).

Structural formula (10)

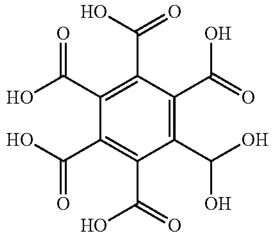

In some embodiments, based on the total added amount of terephthalic acid, adipic acid and carboxybenzene, the added amount of carboxybenzene is 0.1 mol % to 15 mol %. For example, when carboxybenzene is tricarboxybenzene, the added amount thereof is 0.1 mol % to 15 mol %; when carboxybenzene is tetracarboxybenzene, the added amount thereof is 0.1 mol % to 12 mol %; when carboxybenzene is pentacarboxybenzene, the added amount thereof is 0.1 mol % to 10 mol %; when carboxybenzene is hexacarboxybenzene, the added amount thereof is 0.1 mol % to 8 mol %.

Figure 2:
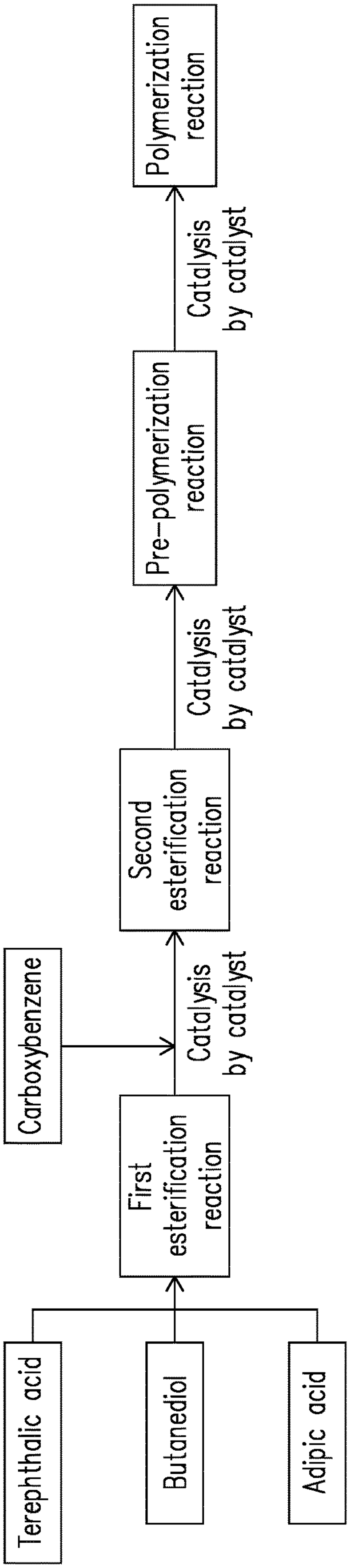
FIG. 2 is a flow chart of a method of manufacturing a polymer according to a first embodiment of the present disclosure.

Then, in step S200, a catalyst is added to the reactant obtained in step S100. In step S300, a polymerization reaction is performed to obtain a polymer represented by structural formula (1). In some embodiments, the catalyst includes titanium catalyst, antimony catalyst, germanium catalyst, magnesium catalyst or a mixture thereof FIG. 2 is a flow chart of a method of manufacturing a polymer according to a first embodiment of the present disclosure. In the first embodiment, the esterification reaction of step S100 in FIG. 1 includes a first esterification reaction and a second esterification reaction, and before the polymerization reaction of step S300 in FIG. 1 further includes a pre-polymerization reaction.

In the first embodiment, terephthalic acid, butanediol and adipic acid are mixed, and the first esterification reaction is performed at the first reaction temperature to obtain the first esterification reaction product. For example, terephthalic acid, butanediol and adipic acid are sequentially added into a reaction flask with a capacity of 2 liters. Nitrogen gas (for example, a flow rate of 40 ml/min) is introduced into the reaction flask, and the temperature of the reaction flask is raised to 190 degrees Celsius. After the temperature of the reaction flask is raised to 100 degrees Celsius, terephthalic acid, butanediol and adipic acid are stirred (for example, at a speed of 100 rpm) with a stirrer. After the temperature of the reaction flask is raised to 140 degrees Celsius, the speed of the stirrer is increased (for example, increased to 200 rpm). After the temperature of the reaction flask is raised to 190 degrees Celsius, and the reaction is continued for 60 minutes, a sample is taken in the reaction flask. The acid value of the sample is measured, and the esterification rate of the sample is calculated. At this time, the acid value of the sample is 100, and the esterification rate is greater than 70%. Next, the temperature of the reaction flask is continued to raise to 220 degrees Celsius, and the reaction is continued for 90 minutes, then a sample is taken in the reaction flask. The acid value of the sample is measured, and the esterification rate of the sample is calculated. At this time, the acid value of the sample is less than or equal to 30 (for example, 30-0.1), and the esterification rate is greater than 90%.

After the first esterification reaction product is obtained using the first esterification reaction. The first esterification reaction product is mixed with carboxybenzene, and the second esterification reaction is performed at a second reaction temperature to obtain a second esterification reaction product, wherein the second reaction temperature is higher than or equal to the first reaction temperature. For example, after the first esterification reaction, carboxybenzene is added in the reaction flask, wherein based on the total added amount of terephthalic acid, adipic acid and carboxybenzene, the added amount of carboxybenzene is 0.1 mol % to 15 mol %. When carboxybenzene is added to the reaction flask, the esterification rate of the mixture in the reaction flask is decreased. The temperature of the reaction flask is maintained at 220° C. to 250° C., and a titanium catalyst is added into the reaction flask. Next, the temperature of the reaction flask is continue to maintain at 220° C. to 250° C., and the reaction is continued for 90 minutes, then a sample is taken in the reaction flask. The acid value of the sample is measured, and the esterification rate of the sample is calculated. At this time, the acid value of the sample is less than or equal to 30 (for example, 30-0.1), and the esterification rate is greater than 90%.

In some embodiments, if butanediol and adipic acid are directly heated to a high temperature before esterification, by-products are likely to be formed, and subsequent products are likely to be yellowed. For example, butanediol readily produces tetrahydrofuran (THF). Therefore, in the first embodiment, the first esterification reaction of terephthalic acid, butanediol, and adipic acid is performed at a lower temperature, followed by the addition of carboxybenzene and the second esterification reaction with a relatively high temperature is performed, thereby reducing the formation of by-products and improving the yellowing problem of the product.

After the second esterification reaction product (i.e., the reactant in step S100 of FIG. 1) is obtained by the second esterification reaction, a pre-polymerization reaction is performed. For example, the second esterification reaction product and the titanium catalyst are added to the first reaction tank, while the temperature of the first reaction tank is maintained at 180 degrees Celsius. A vacuum pump is used to evacuate the first reaction tank to a pressure of less than 100 ton. After the pressure is stabilized, the temperature of the first reaction tank was increased to 190 degrees Celsius, and the reaction is continued for 60 minutes. A condensation polymerization reaction produces gaseous or liquid by-products (such as THF and water) and starting materials (such as butanediol). After reacting at 190 degrees Celsius until gaseous by-products are no longer formed, the temperature of the first reaction tank is increased to 220 degrees Celsius, and the reaction is continued for 60 minutes. Then, the temperature of the first reaction tank is lowered to 200 degrees Celsius, and at the same time, the vacuum pump is turned off and the vacuum state of the first reaction tank is broken with nitrogen gas.

After the pre-polymerization, the pre-polymer in the first reaction tank is poured into the 2-liter second reaction tank. Next, the air in the second reaction tank is replaced with nitrogen gas. The temperature of the second reaction tank is raised to 200 degrees Celsius, and the rotation speed of the stirrer in the second reaction tank is gradually increased to 60 rpm. When the temperature and the rotation speed of the stirrer reached the target values, the second reaction tank is evacuated to a pressure of less than 1 torr with a vacuum pump. After the vacuum degree reaches the target value, the temperature of the second reaction tank is raised to 245 to 250 degrees Celsius, and the change of torque is observed. After the torque reaches the target value, the vacuum pump is turned off and the vacuum state of the second reaction tank is broken with nitrogen gas. Finally, the polymer represented by the structural formula (1) can be obtained after opening the second reaction tank.

In other embodiments, there is no need to pour the pre-polymer in the first reaction tank into the second reaction tank. Instead, the first reaction tank at 200 degrees Celsius is directly evacuated to a pressure of less than 1 torr. After the vacuum degree reaches the target value, the temperature of the first reaction tank is raised to 245 to 250 degrees Celsius and the change in torque is observed. After the torque reaches the target value, the vacuum pump is turned off and the vacuum state of the first reaction tank is broken with nitrogen gas. Finally, the polymer represented by the structural formula (1) can be obtained after opening the first reaction tank.

Figure 3:
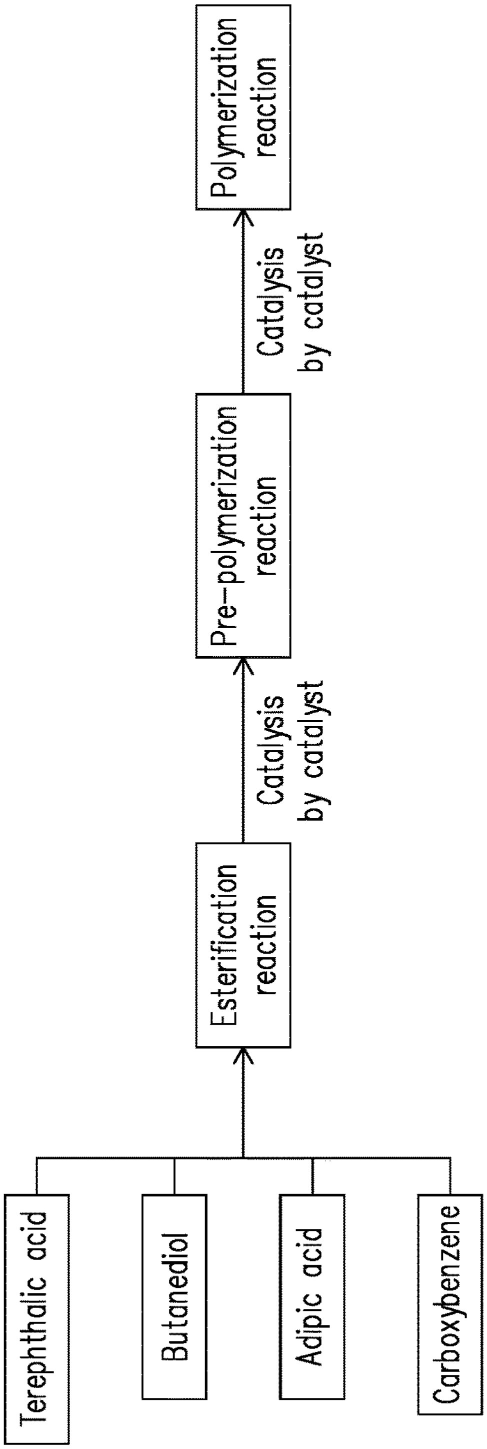
FIG. 3 is a flow chart of a method of manufacturing a polymer according to a second embodiment of the present disclosure.

FIG. 3 is a flow chart of a method of manufacturing a polymer according to a second embodiment of the present disclosure. In the second embodiment, terephthalic acid, butanediol, adipic acid, and carboxybenzene are mixed together for the esterification reaction. Next, titanium catalyst, antimony catalyst, germanium catalyst, magnesium catalyst or a mixture of the above-mentioned catalysts is added to the reactant obtained from the esterification reaction, and a pre-polymerization reaction is carried out. Then more titanium catalyst, antimony catalyst, germanium catalyst, magnesium catalyst or the mixture of the aforementioned catalysts is further added to carry out the polymerization reaction.

To sum up, by adding carboxybenzene, the degree of cross-linking of the polymer can be increased to increase the rigidity of the polymer.

What is claimed is:

1. A manufacturing method of a polymer, comprising:

mixing terephthalic acid, butanediol and adipic acid, and performing a first esterification reaction at a first reaction temperature to obtain a first esterification reaction product;

mixing the first esterification reaction product with at least one of tricarboxybenzene, tetracarboxybenzene, pentacarboxybenzene, and hexacarboxybenzene, and performing a second esterification reaction at a second reaction temperature to obtain a reactant, and wherein the second reaction temperature is higher than or equal to the first reaction temperature;

adding a catalyst to the reactant; and performing a polymerization reaction, wherein the polymer has a structural formula (1):

structural formula (1)

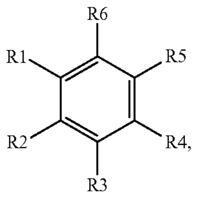

wherein R1 to R6 in the structural formula (1) are each independently selected from the group consisting of: hydrogen, C1 to C8 straight-chain alkyl group, C1 to C8 branched-chain alkyl group, C1 to C8 cycloalkyl group, C1 to C8 alkenyl group, C1 to C8 alkynyl group and a group represented by a structural formula (2), and wherein at least three of R1 to R6 each are groups represented by a structural formula (2):

structural formula (2)

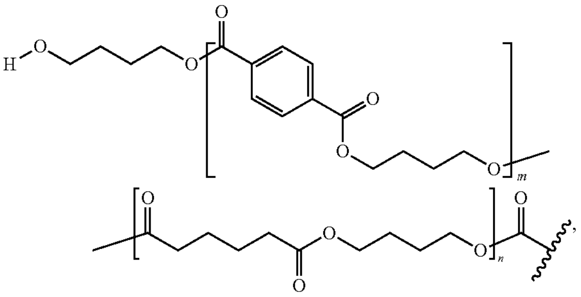

wherein m in the structural formula (2) is 1 to 250, and nis 1 to 250.

2. The manufacturing method of the polymer according to claim 1, wherein based on the total added amount of terephthalic acid, adipic acid and the at least one of tricarboxybenzene, tetracarboxybenzene, pentacarboxybenzene, and hexacarboxybenzene, an added amount of the at least one of tricarboxybenzene, tetracarboxybenzene, pentacarboxybenzene, and hexacarboxybenzene is 0.1 mol % to 15 mol %.

* * * * *